United States Patent [19]

Cahill, Jr.

[11] 3,713,969
[45] Jan. 30, 1973

[54] EMERGENCY SHUT-OFF VALVE FOR NUCLEAR REACTORS

[75] Inventor: William J. Cahill, Jr., West Nyack, N.Y.

[73] Assignee: Consolidated Edison Company of New York, Inc., New York, N.Y.

[22] Filed: Sept. 16, 1969

[21] Appl. No.: 858,465

[52] U.S. Cl. .......................... 176/38, 176/50, 176/87
[51] Int. Cl. ................................................. G21c 9/00
[58] Field of Search .............. 176/38, 37, 50, 65, 87

[56] References Cited

UNITED STATES PATENTS

| 3,205,146 | 9/1965 | Hackney et al. | 176/38 X |
| 3,305,451 | 2/1967 | Taylor et al. | 176/65 X |
| 3,357,892 | 12/1967 | Schmidt | 176/38 X |

FOREIGN PATENTS OR APPLICATIONS

| 1,126,084 | 9/1968 | Great Britain | 176/38 |

*Primary Examiner*—Carl D. Quarforth
*Assistant Examiner*—Harvey E. Behrend
*Attorney*—Brooks, Haidt & Haffner

[57] ABSTRACT

A nuclear reactor vessel for containing coolant and/or moderator fluid under high pressure and having an emergency shutoff valve mounted adjacent each of its fluid inlet and outlet openings, each valve being arranged to automatically close its associated opening in the event of rupture of the external fluid piping which is attached thereto. The valve disc of each valve has convex, spherical-sector shape, and is mounted by a folded leaf spring and tension pin arrangement to a fixed structure, preferably the reactor core, against which the valve disc is normally held in valve-open position. Upon a bursting of the referred to piping, the valve closes in response to the fluid surge forces which are automatically generated by the suddenly changed fluid flow conditions.

9 Claims, 6 Drawing Figures

PATENTED JAN 30 1973
3,713,969
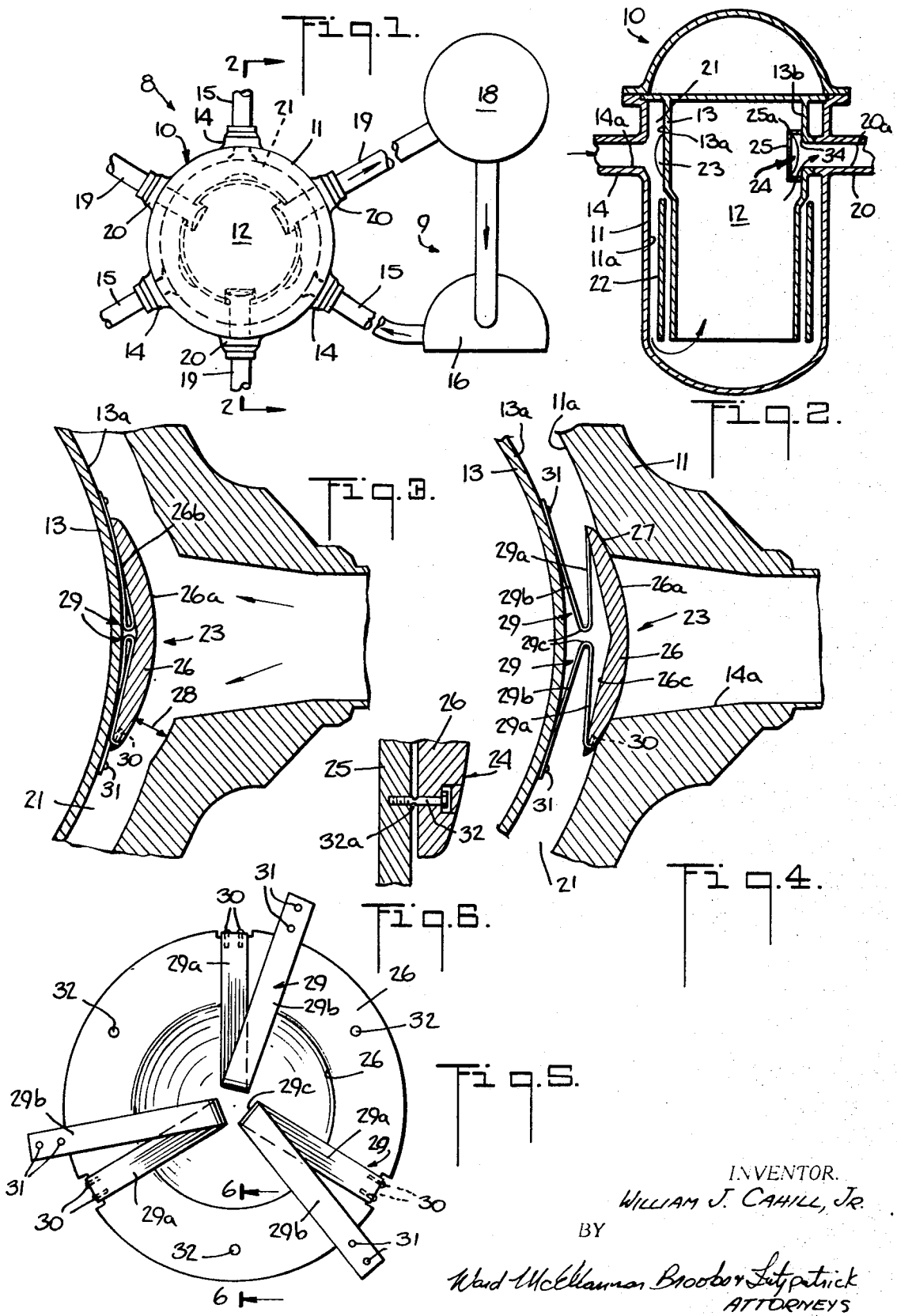
INVENTOR.
WILLIAM J. CAHILL, JR.
BY
Ward McElhannon Brookes Fitzpatrick
ATTORNEYS

EMERGENCY SHUT-OFF VALVE FOR NUCLEAR REACTORS

This invention relates to nuclear power systems, and more particularly to a means for preventing sudden and excessive loss of moderator and/or coolant fluid from the reactor pressure vessel and consequent uncovering and possible displacement of the contained fuel elements in the event of a bursting or major leakage occurring in any of the externally located pipe lines which carry the fluid to or from the reactor vessel.

In a conventional nuclear reactor, the fuel and other operative elements are mounted within a core barrel and are situated in a central core area of the totally enclosed reactor pressure vessel. The vessel has one or more pairs of inlet and outlet nozzles leading to the core area, and moderator and/or coolant fluid, such as water, sodium or other suitable liquid or gaseous material, is forced under very high pressure through these openings in moderating the nuclear reaction and extracting heat from the fuel. This moderator and/or coolant fluid will be hereinafter referred to as "coolant fluid" for convenience. The heated coolant fluid is then circulated from the reactor vessel to a heat exchanger to transfer its heat, and in some instances to generate useful steam for operating turboalternator plants, all as is well known. In order to optimize the rate of heat transfer from the reactor fuel to the coolant fluid, the coolant fluid within the reactor vessel is usually maintained under very high pressure, i.e., from 1000 to 2500 p.s.i. (pounds per square inch) depending on the type of reactor employed.

Although an extremely remote possibility, such high pressures themselves, or other forces acting alone or in conjunction with such high internal pressures, may hypothetically cause sudden rupture of the external piping by which the fluid is conducted to and from the reactor vessel with resulting excessive loss of coolant fluid from the vessel, which would then leave the reactor fuel elements exposed. Of course, conventional reactor vessels have provision for introduction of emergency coolant fluid to keep the fuel elements immersed, as they must be, in the event of excessive fluid loss by any partial or complete stoppage of the main supply.

The present invention contemplates substantially preventing the escape of the coolant fluid from the reactor vessel upon occurrence of such rupture of the externally situated inlet or outlet coolant piping. In accordance with the invention, that opening or nozzle of the reactor vessel to which the ruptured piping is attached will be automatically closed to prevent what would otherwise be swift egress of the coolant fluid through the break. Moreover, it is intended that natural hydraulic force, established in response to the pressure differential resulting from the break, will be utilized to close the nozzle opening by which the fluid is escaping.

Briefly, the invention contemplates provision of an emergency shut-off valve adjacent to each of the several coolant fluid inlet and outlet nozzles, the valves being situated within the reactor pressure vessel. In the event of a large pipe break or a major piping leak in any of the externally located coolant fluid inlet or outlet lines, coolant fluid will tend to escape from the vessel through the broken line and its flow velocity, regardless of whether accompanied by a change in direction, will increase to many times normal velocity. This velocity increase provides sufficient hydraulic force to close the emergency shut-off valve which is situated adjacent that nozzle to which the broken piping is attached. Each valve is designed to remain open under all normal operating and minor emergency conditions, including during anticipated transient changes in coolant fluid flow conditions, pressure surges, external conditions including minor earthquakes, and normal fluid dynamic forces, but will close if the contemplated emergency should ever occur. The force required to actuate each shut-off valve can be modified by the inclusion or not of shear pins, tension bolts, or other controlled-failure devices, or by predetermined stress deformation of the valve support and guide system.

However, known types of shut-off valves appear to be unsuitable for the intended purpose. That is, since the coolant fluid inlet and outlet lines may measure some 3 feet in diameter, any externally located standard type shut-off valve situated in the line would require an inordinately massive valve body and other components. The invention therefore contemplates elimination of the need for a valve body and similar extraneous components by situating each valve within the reactor itself and utilizing certain elements of the reactor structure either to form or to mount the necessary elements of the valve. Moreover, the valve must fit within available space restrictions of a conventional nuclear reactor, and must not interfere with the normal flow of coolant fluid, or other operation of the reactor. Thus, the invention provides shutoff valves having particular construction such that they may be situated at certain locations within the reactor.

In its preferred embodiment, each valve has a fairly flat and thin valve disc whose closure face has shape generally that of a convex spherical sector. At coolant fluid inlet openings where the nozzle structure conventionally does not pass through the core barrel of the reactor, the valve disc is mounted, in alignment with the nozzle opening, on the vertical cylindrical outer surface of the core barrel itself, and the corresponding but concave-shaped valve seat is formed in the interior surface of the pressure vessel as it surrounds the inlet nozzle. The valve opening, between the disc and the seat, approximates the conventional spacing between the walls of the core barrel and the surrounding pressure vessel. At coolant fluid outlet openings where the outlet nozzle structure conventionally extends through the core barrel, the valve disc is similarly mounted in aligned, spaced relation with the outlet nozzle opening, but on suitable support structure located interiorly of the core barrel, and the valve seat is formed on the interior wall of the core barrel. At both the inlet and outlet openings the spherical shaping of the valve seat in conjunction with that of the closure face of its associated valve disc effects a streamlining of the flow of coolant fluid past the valve so that normal operating conditions of the reactor are not changed by the inclusion of the shutoff valves.

In the preferred embodiment the mounting arrangement of each valve disc adjacent either an inlet nozzle or an outlet nozzle is by a plurality of angularly folded and flattened leaf springs attached in annularly and equally spaced apart relation about the valve disc, one end of each spring being attached to the referred to valve support structure, and the other being attached to the valve disc, all in manner as will be described. The rearward surface of each valve disc is recessed to provide a hollowed space for receiving the double thickness of the overlapped spring leaves, so that the valve disc normally seats as snugly as possible against its fixed support structure. Thus, and considering that the valve disc is not enclosed or surrounded by any valve body structure as would shield the back of the valve disc, any flow of coolant fluid behind the valve disc under normal conditions of operation is minimized. Further to assure that the valve will remain open during normal conditions of operation, it will be noted that the bias of the leaf springs is towards their flattened condition, i.e., that which holds the valve in its open position.

Each valve disc and its mounting arrangement permits the free flow of coolant fluid through the valve and its associated nozzle opening under normal operating conditions of the reactor, as well as during the previously referred to anticipated transient changes in coolant fluid pressure or flow conditions. However, valve closing movement is initiated by velocity-induced suction caused by the surging of the highly pressurized coolant fluid through the valve opening upon any break or other sudden major leakage occurring in the externally located coolant piping leading to the opening. In this connection, it is apparent that any such rupture or major leakage will cause an immediate drop in line pressure adjacent the break, so that high velocity flow towards the break will be immediately induced due to the high pressure within the reactor pressure vessel. In manner similar to a plug being sucked into an open drain, the valve disc is moved towards the nozzle opening against the bias of its referred to mounting springs. After such closing movement has been initiated, high pressure coolant fluid surges in substantial quantity behind the valve disc to assist the closing action.

Although not preferred, the valve disc mounting arrangement adjacent the outlet nozzles may further include tension bolts, respectively located midway between the respective of the referred to three leaf springs and attaching the disc to its fixed support structure, which positively secure the valve disc in its open position and whose "necked down" construction fails under tension upon the occurrence of the referred to strong suction pull on the valve disc as is induced when a break in the coolant fluid outlet piping occurs. Such inclusion of tension bolts may be necessary due to the normal direction of flow through the outlet nozzles which tends to establish the referred to fluid suction forces which initiate valve closing action. Whether or not such tension bolts are included, it will be noted that the closing movement of the valve disc is guided by the annularly disposed leaf springs in the mounting arrangement.

Upon occurrence of such a break in the external piping leading to the reactor, the emergency shut-off valve arrangement provided by the invention permits only a relatively small quantity of coolant fluid to escape from the reactor pressure vessel. If the reactor supports several heat exchanger circuits, it is further apparent that the emergency shut-off valve arrangement of the invention permits continued operation of the reactor and of those heat exchanger circuits other than that in which the referred to breakage or major leakage occurs. It will be further noted that each valve and its mounting arrangement is relatively uncomplicated and involves no moving parts as such, so that virtually no maintenance or inspection thereof is required over prolonged periods of time.

These and other objects, features and advantages of the invention will be more fully apparent from the following detailed description of a preferred embodiment thereof, when taken in conjunction with the drawings in which:

FIG. 1 is a diagrammatic and fragmentary plan view of a nuclear power system incorporating a nuclear reactor having emergency shut-off valves in accordance with the invention;

FIG. 2 is a diagrammatic sectional side elevation of only the reactor pressure vessel, core barrel, and emergency shut-off valve arrangement, as seen from lines 2—2 of FIG. 1;

FIG. 3 is an enlarged and fragmentary sectional plan view taken at one of the inlet nozzle openings of a reactor vessel such as shown in FIG. 2, and showing the normally open position of the contemplated emergency shut-off valve;

FIG. 4 is a fragmentary sectional plan view similar to FIG. 3, but showing the valve in closed position;

FIG. 5 is an enlarged, rear plan view of a valve disc and mounting structure as incorporated in either an inlet or an outlet emergency shut-off valve; and FIG. 6 is a further enlarged fragmentary sectional view taken at lines 6—6 of FIG. 5 showing details of one of the tension bolts which may be incorporated in the outlet valve mounting arrangement.

As illustrated in FIGS. 1 and 2, a typical nuclear power system 8 includes one or more heat exchanger circuits 9 attached to a nuclear reactor 10. The reactor 10 includes an upright, generally cylindrical, totally enclosed reactor pressure vessel 11 for housing a reactor core which, though not illustrated, occupies the core area generally indicated by reference numeral 12 and includes a cylindrical core barrel 13. The reactor contains coolant fluid (not shown) under high pressure, on the order of from 1000 to 2500 p.s.i., for moderating the reaction and extracting heat from the reactor core. The pressure vessel 11 has one or more coolant fluid inlet nozzles 14 (three being shown), having nozzle openings 14a, each of which is connected by inlet piping 15 to a pump 16, the latter being parts of the heat exchanger circuit 9. The relatively cool fluid entering the reactor vessel via the inlet nozzle 14 is being recirculated from a heat exchanger 18 as indicated by the arrow heads. Hot fluid from the reactor 19 is pumped to the heat exchanger 18 via the fluid outlet piping 19 connected to the coolant fluid outlet nozzle 20. The outlet nozzle is one of a number corresponding to the number of inlet nozzles 14, with which each outlet nozzle is paired. The outlet nozzle opening is indicated by numeral 20a.

For the purposes of illustration only one heat exchanger circuit 9 is fully shown, but it will be appreciated that the other indicated reactor inlets 14 and outlets 20 (see FIG. 1) would also be connected to a heat exchanger circuit in the same manner, and that the number of inlets 14 and outlets 20 employed will depend upon the size and design of the nuclear reactor. In a typical reactor, the openings 14a and 20a may measure as much as three feet in diameter.

The concentrically mounted core barrel 13 which surrounds the subassemblies (not shown) of the reactor core, defines a cylindrical space or passageway 21, typically about eight inches wide in the region adjacent the nozzles 14 and 20, extending around the interior surface 11a of the pressure vessel 11. As shown in FIGS. 1 and 2, the outlet nozzles 20 pass through the core barrel 13 to receive heated coolant fluid from the core interior region 12. However, the inlet nozzles 14 conventionally extend only through the outer pressure vessel 11, the entering stream of coolant fluid impinging directly upon the outer surface 13a of the core barrel 13, and thence passing downwardly within the cylindrical spacing 21, perhaps past conventional cylindrical shielding 22, and thence upwardly from beneath the core barrel 13 to the core area 12.

If for any reason a major break occurs in any of the external piping 15 or 19, there will be a sudden rush of coolant fluid from the reactor vessel interior towards, and outward through the piping in which the rupture has occurred. If the failure is in the outlet piping 19, the flow towards the break will be in the same direction as during normal operation. If the failure is in the inlet piping 15, it is apparent that the normal direction of flow through the inlet nozzles 14 will be reversed. However, in either case the initial flow velocity will be very high, due to the now abnormally large pressure differential of from about 1000 to almost 2500 p.s.i. between the interior of the vessel and the location of the break. It is the hydraulic force created by this initial surging of fluid which is utilized to actuate an appropriately mounted emergency shut-off valve, situated within the pressure vessel 11, to promptly terminate the outward flow of coolant fluid.

In accordance with the invention, a normally-open emergency shut-off valve is mounted adjacent to each coolant fluid inlet and outlet opening of the reactor. Adjacent each inlet nozzle 14 the emergency shut-off valve 23 includes a fixed valve support provided by the exterior surface 13a of the core barrel 13, such being possible because the inlet nozzle does not extend through the core barrel. Adjacent each outlet nozzle 20 which does extend through to the interior of the core barrel 13, the emergency shut-off valve 24 includes a suitable valve support structure 25 which is attached to the interior wall surface 13b of the reactor core, as indicated in FIGS. 1 and 2. Excepting for its fixed support means, which in the one instance is the outwardly facing surface of the core barrel itself and in the other instance is a suitable structure 25 attached to but spaced away from the interior surface of the core barrel and having legs 25a straddling the outlet opening, the construction and arrangement of the inlet and outlet emergency shut-off valves is essentially the same. FIGS. 3 and 4 illustrate the construction and operation of a typical inlet valve 23 which will now be described, it being understood that excepting as previously noted and excepting for the location of the valve seat, the construction and operation of each outlet valve 24 is identical.

Referring to FIGS. 3–5, each valve 23 (or 24) further includes a valve disc 26 whose closure face 26a has generally the shape of a convex spherical sector, excepting that it is also cylindrically curved, as necessary, about a vertical axis such that its rearward surface 26b corresponds with any cylindrical curvature of the fixed valve support on which it is mounted, which in the case of an inlet valve 23 is the core barrel as previously mentioned. For flatness and compactness the valve disc 26 is formed from a thin but high strength steel, such as a high alloy steel, and it will be noted that the disc in its normally-open position as shown in FIG. 3 is aligned with the central axis of the coolant fluid opening with which it is associated. When the valve is closed as illustrated in FIG. 4, the valve disc 26 moves with linear or translatory movement, its closure face 26a seating against a corresponding but concaved spherical-sector shaped valve seat 27 which is formed on the interior surface 11a of the reactor pressure vessel 11, in surrounding relation with the inlet nozzle opening 14a as indicated. The respective curvatures, and the spacing apart of the valve disc closure 26a and the valve seat 27 when the valve is in open position as shown in FIG. 3, is such as will not significantly obstruct or modify the normal flow of coolant fluid through the associated nozzle opening. That is, the valve opening 28 (FIG. 3) as nearly as possible permits fluid flow through the valve at the same rate as would obtain in the absence of a valve disc 26 within the spacing 21. Of course, the curvilinear shape of the valve disc closure face and seat effect a streamlining of the flow path through the valve. A similarly shaped valve seat 34 is formed in, or attached to the interior surface 13b of the core barrel 13 in surrounding relation to each of the outlet openings 20a as indicated in FIG. 2.

As will be understood particularly from a comparison of FIGS. 3 and 5, each valve disc 26 is mounted and held in its normally open position as shown in FIG. 3 by three, annularly and equally spaced apart, centrally folded and flattened leaf springs 29. Because the respective leaves 29a and 29b of each spring 29 are displaced at an angle of 18° in the lateral or annular direction as seen in FIG. 5, they overlap, and therefore present double thickness, along only a portion of their lengths extending outwardly from the folded end 29c adjacent the center of the valve disc 26. Accordingly, the reverse or rearward face 26b of the valve disc 26 is recessed, as at 26c, to accommodate such double thickness of the springs 29, and thus permit the disc to fit more closely against the fixed valve support structure, which in the case of an inlet valve is the core barrel 13. The otherwise free outer end of one leaf 29a of each spring 29 is attached, as by rivets 30 to the outer periphery of the valve disc 26 which is appropriately notched to receive it, as best seen in FIG. 5. The outer end of the other leaf 29b lies flat against, and is attached, as by rivets 31, to the surface 13a of the core barrel 13. In the case of outlet valves 24 the leaf 29b is similarly attached to the either flat or cylindrically shaped surface of the fixed valve support 25. The springs 29 are made of a corrosion-resistant steel, such as inconel, and are appropriately designed to support the relatively heavy valve disc 26 in its referred to normally opened position while withstanding hydraulic forces as are normally generated by the impinging or passing flow of coolant fluid. They must expand the required distance, in this instance about 8 inches, when the valve disc moves to closed position as illustrated in FIG. 4, and the collective bias of the three springs 29 must be such as will be overcome by a predetermined excessive hydraulic force as is generated at the valve opening upon rupture or major leakage occurring in the piping leading thereto, as previously explained. It will be noted that the folded leaf spring mounting arrangement and the relatively thin valve disc construction permits the valve to be situated within the relatively confined spacing 21.

Because the fluid flow through the outlet openings 20a is in direction tending to close the outlet valves 24, the latter may require additional constraining to their normally open position by three, annularly and equally spaced apart tension bolts 32, as indicated in FIGS. 5 and 6. The bolts 32 are "necked down," as at 32a, such that together they fail upon exposure of the valve disc 26 to a predetermined excessive suction force, as aforesaid. It should be noted, however, that the springs 29 are also included in the mounting arrangement of the outlet valves 24 for the purpose of guiding the valve closing movement following tensile rupture of the bolts 32. Thus, it is apparent that the bolts 32 are considered more in the nature of a safety device, and are preferably omitted.

The rate of fluid flow through any of the piping 15 and 19 during normal operation of the nuclear reactor 10 is ineffective to draw the valve discs 26 to their closed positions against their respective valve seats 27 or 34. If a serious rupture occurs in any of the piping 15 or 19 leading to the reactor vessel 11, fluid will tend to rush from the reactor vessel through the line in which the break occurred, towards the failure point due to the sudden creation of a large pressure differential between that existing in the reactor vessel and that at the point of failure. This sudden surge in flow velocity exerts a suction force acting on the closure face 26a of the valve disc 26, which overcomes the valve disc restraining forces provided by the leaf springs 29, and tension bolts 32, where included, such that the valve disc 26 will be moved towards its associated valve seat 27 or 34. Because the back surface 26b is accessible to the coolant fluid, an avalanching effect is created in that the coolant fluid will begin to exert progressively greater hydraulic force behind the valve disc which combines with the aforementioned hydraulic suction force such that the valve will close almost instantaneously. Thus, there is no significant loss of coolant fluid or of internal pressure from within the reactor vessel, and these will hold the now closed valve in its closed position until the pressure is restored in the piping 15 or 19 leading to the closed valve, whereupon it will automatically open in response to the bias of springs 29. Of course, replacement of the ruptured tensile bolts 32 would require that access be gained to the interior of the vessel, and this is another reason why such bolts are preferably omitted.

The bias force of the springs 29 which must be overcome in closing the valve can be predetermined and correlated with the anticipated increase of flow velocity of the coolant fluid and the operation of abnormally great hydraulic force as will take place upon occurrence of a pipe failure in any of the heat exchanger circuits.

It will also be noted that the direction of the bias of the springs 29, towards the open position of the valve, eliminates the need for any such restraining bolts as would require replacement, provided that the predetermined excessive hydraulic force necessary to close the valve can be accurately determined. The bias direction also ensures that the valve will not accidentally close during normal operation of the reactor.

Thus has been described an emergency shutoff valve arrangement in a nuclear reactor, which achieves all of the objects of the invention.

What is claimed is:

1. In a nuclear reactor pressure vessel for containing coolant fluid under high pressure and having means defining a coolant fluid opening by which said coolant fluid flows between the interior of said vessel and an exteriorly located pipe circuit, the improvement comprising a normally-open emergency shutoff valve located interiorly of said vessel adjacent to said coolant fluid opening for closing the latter by excessive differential hydraulic force generated upon a rupture of said pipe circuit, said shutoff valve comprising fixed support means adjacent to said coolant fluid opening, a valve seat surrounding said coolant fluid opening, a valve disc having a valve closure face for engaging said valve seat to close said valve, and means mounting said disc on said fixed support means in a valve-open normal position axially aligned with and spaced from said valve seat, said mounting means comprising means movable in response to said differential hydraulic force to permit said disc to move in axial direction to a valve-closed position whereat its said closure face is against said valve seat.

2. The improvement according to claim 1 wherein at least the periphery of said valve disc is exposed to permit accumulation of coolant fluid behind said valve disc during and after its movement to its said valve-closed position.

3. The improvement according to claim 1 wherein said nuclear reactor pressure vessel contains a core barrel, and said fixed support means comprises said core barrel.

4. The improvement according to claim 1 wherein said valve disc mounting means comprises spring means attached between said fixed support means and said valve disc and biasing said valve disc torward its said valve-open position, the bias of said spring means being less than said excessive differential hydraulic force.

5. The improvement according to claim 4 wherein said spring means comprises a plurality of folded leaf springs disposed in annularly and equally spaced apart relation around said valve disc, each said leaf spring being folded in substantially overlapping relation providing a folded end and a pair of free ends, one of said free ends of each said leaf spring being attached to said fixed support means, and the other of said free ends of each said leaf spring being attached to said valve disc.

6. The improvement according to claim 5 wherein said free ends of each said leaf spring are angularly spaced apart a distance of substantially eighteen degrees (18°) with respect to each other, the rearward surface of said valve disc being recessed to receive the overlapping portion of each said leaf spring.

7. The improvement according to claim 4 wherein said valve disc mounting means further comprises tension bolt means retaining said valve disc in its said valve-open position, the bias of said spring means and the tensile strength of said tension bolt means together being less than said excessive differential hydraulic force.

8. In a nuclear reactor pressure vessel in which high pressure coolant fluid is circulated and which has means defining a coolant fluid inlet opening and a coolant fluid outlet opening to each of which exteriorly located coolant fluid piping is attached, the improvement comprising a normally open emergency shutoff valve adjacent to each of said coolant fluid inlet and outlet openings, each said emergency shutoff valve being situated inside of said pressure vessel and being closable by hydraulic force exerted thereon upon occurrence of a predetermined pressure differential between the fluid in said pressure vessel and the fluid in said piping attached to that opening with which the valve is associated, and each said valve comprising fixed valve support means adjacent to its said associated coolant fluid opening, a substantially concave spherical-sector shaped valve seat surrounding said associated coolant fluid opening, a valve disc having a substantially convex spherical-sector shaped valve closure face for engaging said valve seat and closing said valve, and means mounting said valve disc on said fixed support means in a valve-open position wherein its said valve closure face is spaced away from, and aligned with the axis of said valve seat and its associated opening, said valve disc being linearly moveable to a valve-closed position wherein its said valve closure face so engages said valve seat, the periphery of said valve disc being exposed to permit accumulation of coolant fluid behind said valve disc during and after its movement to its said valve-closed position, said valve disc mounting means comprising a plurality of folded leaf springs disposed in annularly and equally spaced apart relation around said valve disc, each said leaf spring being folded in substantially overlapping relation providing a folded end facing towards the center of said valve disc and a pair of free ends adjacent to the periphery of said valve disc, one of said free ends of each of said leaf spring being attached to said fixed support means, and the other of said free ends of each said leaf spring being attached to said valve disc.

9. The improvement according to claim 8 wherein said fixed support means associated with all of said emergency shutoff valves comprises a reactor core barrel within said nuclear reactor pressure vessel.

* * * * *